INVENTOR.
WILLIAM L. GELLER
BY
R. J. Frank
ATTORNEY.

INVENTOR.
WILLIAM L. GELLER

BY R. J. Frank
ATTORNEY.

INVENTOR.
WILLIAM L. GELLER
BY
R. J. Frank
ATTORNEY.

INVENTOR.
WILLIAM L. GELLER
BY
R. J. Frank
ATTORNEY

INVENTOR.
WILLIAM L. GELLER

BY R. J. Frank
ATTORNEY.

United States Patent Office 3,382,438

Patented May 7, 1968

3,382,438

NONLINEAR PULSE CODE MODULATION SYSTEM CODING AND DECODING MEANS

William L. Geller, Plainview, N.Y., assignor to General Telephone and Electronics Laboratories, Inc., a corporation of Delaware Filed July 13, 1964, Ser. No. 382,090
5 Claims. (Cl. 325—38)

ABSTRACT OF THE DISCLOSURE

Bipolar coding means for a PCM system is described in which the attenuation of a reference voltage by a network of matched resistive attenuators is varied in accordance with a PCM signal to reconstruct a quantized signal sample. A voltage having a polarity opposite to the reference voltage and a magnitude which is a function of the quantizing characteristic is added to the output of the attenuator network. The sum of these voltages is essentially zero when the attenuation provided by the network is at a maximum to permit bipolar operation of the coding means.

This invention relates to nonlinear pulse code modulation system and more particularly to novel coding means for use therein.

Pulse code modulation or PCM communication systems employ an encoder at the transmitting terminal to convert the magnitude and polarity of a sample of an inteligence signal, such as an audio signal, to a group of pulses in accordance with a predetermined code. These pulse groups are the transmitted signal and must be translated at the receiver into a representation of the original signal. A decoder is provided at the receiver to reconstruct the signal sample. The sample may then be recombined with adjacent samples to recover the original signal.

The pulse code generally used is the binary code wherein information is expressed by the presence or absence of a pulse at a particular point in time. Since the receiver must only distinguish between these two states, a substantial amount of noise and distortion may be tolerated during transmission without affecting the quality of the reconstructed signal sample. Also, pulse code groups representing samples of different signals may be time-division multiplexed to greatly increase the capacity of a transmission system.

In practice, the performance of a PCM system is primarily determined by the characteristics of the coding means employed in both the encoding and decoding operations. The translation of the information-bearing electrical signal into the bits of an appropriate pulse code has been found to introduce certain error components. One source of error is readily eliminated by providing that the rate at which the signal is to be sampled is at least twice as great as the highest frequency component of the signal. This insures that the signal when reconstructed contains all wanted frequency components.

However, a deliberate error is introduced by the very nature of the encoding process. When an individual sample of a signal is taken, its magnitude and polarity are expressed in binary notation to form an individual pulse code group. The maximum number of bits in a pulse code group is fixed so that the decoder can reconstruct the signal sample. By minimizing this number, the capacity of the transmission system is increased as more code groups may be multiplexed in a given interval.

The imposition of a fixed number of bits per code group limits the total number of permutations possible within an individual code group. This is apparent from consideration of the binary code, wherein the number of permutations possible is equal to $2^n$ in which $n$ is the number of bits representing magnitude per code group, noting however that an additional bit is used to denote polarity. Since this fixed number of permutations must represent the magnitude of a continuous electrical signal, a method of approximation known as quantization is employed in the encoding operation.

Quantization requires that the number of possible permutations, each of which corresponds to a particular signal amplitude, be distributed throughout a quantizing range broad enough to accommodate the strongest signal encountered in a given application. In the case of an audio signal, which may be either negative or positive at a particular moment, the quantizing range must extend throughout the range of the strongest negative and positive signals. Each sample of the signal is compared to this ladder-like array of quantizing steps and all amplitudes falling in any portion of a step are replaced by a single value uniquely characterizing that interval and corresponding to a particular permutation of the pulse code.

From the foregoing it is seen that quantization introduces a deliberate error that remains when the signal is reconstructed at the receiver. If each quantizing step in the aforementioned ladder-like array is given equal weight, the quantizing error is most serious for the weakest signals. When a particular voltage, for example the step voltage, is assigned to all amplitudes falling in a particular quantizing interval, the absolute value of the error in any pulse sample will be limited to values between zero and the size of the step in question. The ratio of the error signal to the signal sample is therefore highest for signals of low amplitude.

This deliberate error appears in the reconstructed signal after decoding and results in distortion. This distortion can be quite severe when the PCM system is employed in commercial telephony, wherein the occurrence of the smaller signal is more probable than that of the greater signal. Accordingly, PCM systems giving unequal weights to the quantizing steps are desirable. These systems redistribute the quantizing levels such that the spacing is closer at lower signal amplitudes. The proper choice of the nonlinear parameter controlling incremental step size enables the error to signal sample ratio to be substantially improved throughout the small signal range without necessitating a change in the total number of quantizing steps employed.

However, to permit quantization of bipolar signals, the quantizing characteristic of the encoder must be symmetrical to insure that no distinction be made between positive and negative signal samples of equal magnitudes. Also, the inverse of the encoder quantizing characteristic must be exhibited by the decoder to provide accurate reconstruction of the signal sample. The system coding response should therefore be linear over the entire bipolar quantizing range so that the distortion resulting from the use of a PCM system is limited to the maximum deliberate error introduced by the nonlinear quantization. When the decoder and encoder characteristics are so matched, substantially no error is present due to the reconstruction of the quantized signal sample by the decoder.

One method of achieving nonlinear quantization utilizes the inherent characteristics of semiconductor diodes to provide nonlinear amplification of the signal prior to sampling. The distorted signal is then sampled and quantized in accordance with a linear characteristic. This method of encoding has been found to suffer from disadvantages arising from the dependence placed on these inherent diode characteristics, such as lack of stability with temperature variation and attaining a particular nonlinear parameter. Further, the inverse of this characteristic must be exhibited by the decoder at the receiver to prevent mistracking. The difficulty in obtaining proper tracking in the above system has resulted in a generally unpredictable error being introduced at the point of reconstruction.

Alternatively, PCM systems having nonlinear parameters utilizing tandem or cascaded attenuators, wherein the permutations of the pulse code correspond to the products of the attenuation of selected attenuators, have been proposed. This attenuator network is connected directly in the signal path so that the signal is attenuated by varying amounts and continually compared with a constant voltage until the difference is substantially zero. The particular combination of attenuators needed for a zero difference voltage is indicative of the pulse code group for this sample.

Several disadvantages arise in using this method, one of which is due to the fact that as quantizing steps of increasingly smaller amplitude are employed, the quantities to be compared become quite small. Thus an amplifier is inserted in the attenuator network to increase the level of comparison. However, this alters the nature of the attenuator network from a passive to an active network which depends on the operation of this amplifier for accurate encoding. Due to the problems attendant in the normal use of amplifiers such as drift and temperature variation, the possibility of unwanted errors being introduced both at the decoder and the encoder is substantially increased. Also, the use of a constant polarity comparator has prevented bipolar operation of the system unless an inverting amplifier is inserted in the signal path.

Accordingly, it is an object of the present invention to provide bipolar coding means for a PCM system in which the encoder and decoder characteristics are matched throughout the quantizing range to prevent mistracking.

Another object is to provide bipolar coding means in which the need for signal sample inverting means is obviated.

A further object is to provide coding means wherein the encoder and decoder characteristics are determined substantially only by passive networks.

Another object is to provide bipolar coding means in which the encoder and decoder characteristics are symmetrical.

This invention relates to a bipolar coding means that is suitable for use in both an encoder and decoder. The bipolar coding means is comprised of a network of matched resistive attenuators to which a reference voltage is applied at the input terminal and a voltage of opposite polarity, having a magnitude determined in accordance with the permutation code employed, is applied at the output terminal.

The attenuators have their individual attenuations determined by the nonlinear permutation code and may be selectively removed from the network in response to a magnetitude bit of the pulse code group. The individual attenuators are controlled by transistor switches which in turn are actuated by the magnitude bits to short-circuit individual attenuators and provide a loss-less bypass thereof. The total attenuation of the network is thus varied to provide an output voltage whose magnitude is determined by the magnitude bits of a pulse code group. As the number of attenuators removed or bypassed increases, the output voltage increases in accordance with the ladder-like array of quantizing levels. The bipolar reference voltage applied to the input of the attenuator network is selected to have a magnitude such that the removal of all switchable attenuators provides an output voltage equal to the largest quantized signal to be transmitted.

However, to provide bipolar operation, the voltage at the output terminal of the coding means should be zero when all the attenuators are inserted for maximum attenuation. To this end, a voltage of opposite polarity to the reference voltage is applied to the output of the attenuator network. This voltage has a magnitude that is determined by the permutation code employed and results in a zero coding means output for the attenuator all-inserted situation. By changing the polarities of the reference voltage and the voltage applied at the output of the attenuator network, the coding means is capable of bipolar operation.

By supplying the bits of a PCM code group from a receiver to the corresponding attenuator switches, the coding means may be employed as a decoder with the output corresponding to the reconstructed signal sample in both magnitude and polarity. Also, the invention may be employed as an encoder by connecting it so that its output is continuously compared with the signal sample, while the input thereto is from the PCM pulse generator.

The use of the invention as an encoder eliminates the need for an attenuator network connected directly in the signal path. The encoder operation is also bipolar, as the initial voltage applied at the point of comparison is zero due to the attenuator network having a normal all-in condition. The polarity bit generated by the pulse generator then determines the polarity of the reference voltage applied to the attenuator network for the succeeding comparisons.

Further features and advantages of the invention will become more readily apparent from the following description of specific embodiments when taken in conjunction with the accompanying drawings, in which.

Figure 1:
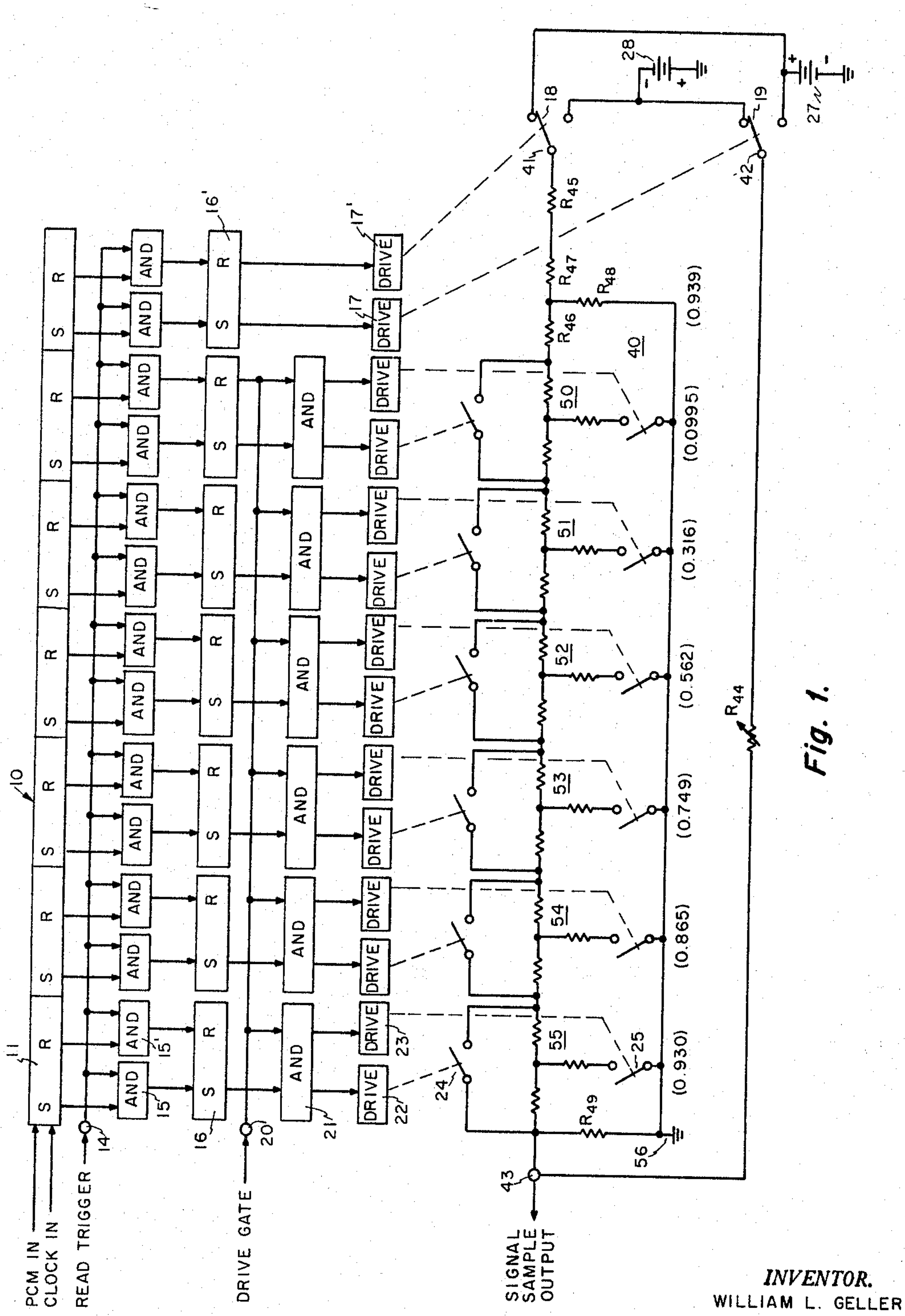
FIG. 1 is a block schematic diagram of a decoder in accordance with the invention.

Referring more particularly to the decoder shown in FIG. 1, the PCM pulses are supplied as received in a serial manner to first stage 11 of register 10. Shift register 10 is comprised of a plurality of binary stages, each of which is capable of sequentially storing one bit of a pulse code group. However, other forms of storage means, such as a tapped delay line, may be employed if desired.

In addition, clock pulses generated by a suitable pulse generator, for example a blocking oscillator, are supplied to the shift register. Since a bit in the PCM code is characterized by either the presence or absence of a pulse, the clock pulses serve to shift the bits serially through register 10 in a manner well known in the art.

The number of magnitude bits in a PCM code group determines the number of possible permutations and therefore limits the number of quantizing steps. A PCM group comprising six magnitude bits, in addition to a polarity bit, has been found suitable for use in commercial telephony. Hence register 10 must contain at least that number of stages equal to the total number of magnitude and polarity bits in a PCM group. If a marking pulse or additional information bit is used, the number of stages may be increased accordingly.

At the receipt of an entire PCM group, in this case seven bits, a read trigger is applied to terminal 14 and thus to a plurality of coincidence or "and" gates 15, 15'. As shown, "and" gates 15 are connected to the set portion of the register stages and will pass a pulse only if a PCM pulse is present in that bit, while "and" gates 15' pass a pulse corresponding to the absence of a PCM pulse.

The output of "and" gates 15, 15' are supplied to individual flip-flops 16, 16' having two stable states as well known in the art. The states of flip-flops 16, 16' are determined directly by the states of the corresponding stages of register 10. This transfer, occurring at the start of every seventh bit, enables shift register 10 to begin receiving the next PCM group independently of operations performed with its predecessor group. However, the read trigger must terminate before the receipt of the next PCM pulse by first stage 10 to prevent destruction of the pulses passed through "and" gates 15, 15'.

As seen in FIG. 1, storage means 16' is in a set (S) or reset (R) condition depending on the presence or absence of a pulse in the first bit of a PCM group. This is the polarity bit and in this particular embodiment the absence of a pulse therein denotes that a positive signal has been sampled and transmitted. Storage means 16' has its set and reset states individually connected to drive means 17, 17' respectively, which in turn control the action of switches 18 and 19 to determine the polarity of the reference voltage supplied to attenuator network 40.

Assuming storage means 16' is in its reset state due to the absence of a pulse, drive means 17' responsive thereto causes switch 18 to connect to positive reference voltage 27. Drive means 17 is not actuated and hence switch 19 is connected to negative reference voltage 28. However for systems using a pulse to denote a positive signal sample, the operation of the switches may be reversed.

The reference voltage applied between terminal 41 and ground may be of either polarity and, for reasons that later become apparent, has a magnitude that is 2.15 times that of the largest signal sample to be transmitted. The voltage applied between terminal 42 and ground is of equal magnitude and opposite polarity. Terminal 42 is connected to output terminal 43 through resistor $R_{44}$, while terminal 41 is connected through attenuator network 40.

Subsequent to the polarity determination, a drive gate signal is applied at terminal 20 and to coincidence or "and" gates 21. Gates 21 are responsive to the set positions of flip-flops 16 so that the presence of a PCM pulse in a bit actuates the corresponding drive means 22 and 23 connected thereto. As seen in FIG. 1, drive means 22 are connected to corresponding series switches 24 while drive means 23 control shunt switches 25.

Each individual attenuator 50 through 55 has both a series switch 24 and a shunt switch 25 associated therewith. Each series switch has a normally open position while the shunt switches are normally closed. When a pair of drive means 22 and 23 are actuated by the coincidence of the drive gate and set condition of flip-flop 16, switch 24 is closed to provide a loss-less bypass of the single attenuator and switch 25 is opened to complete the removal thereof from the attenuator network 40. The number of selectively removable attenuators is equal to the number of magnitude bits in the pulse code used, and in this case is six. Hence only those attenuators actuated by the presence of a pulse in the corresponding PCM bit will be removed and the amount of attenuation provided between terminals 41 and 43 is therefore determined by the individual attenuation of the unremoved attenuators.

Individual attenuators 50, 51, etc. comprised of resistors, are shown having a T configuration tied to ground point 56. However, other configurations, such as L or $\pi$, may be employed if desired. Each attenuator is matched by being terminated in its iterative impedance so that the selective removal thereof will not substantially alter the characteristic impedance seen by adjacent attenuators. The amount of attenuation provided by each is determined by the number of quantizing steps and the nonlinear parameter employed. It is to be noted that the largest attenuator 50 is responsive to the PCM bit of greatest significance.

In this particular embodiment, a logarithmic permutation code as derived in an article entitled "Instantaneous Companding of Quantized Signals" by B. Smith appearing in the Bell System Technical Journal for May 1957, at page 653, is employed with the nonlinear characteristic, $\mu$, chosen to be 100. The relation between the magnitude of the signal sample and the binary code is expressed by the following equation (1)

$$\frac{b_5 2^5+b_4 2^4+b_3 2^3+b_2 2^2+b_1 2^1+b_0 2^0}{64}=\frac{\log(1+\mu|E|)}{\log(1+\mu)}$$

wherein the $b$ coefficients represent the digits in the PCM code in decreasing significance and $|E|$ is the magnitude of the signal voltage normalized with respect to the reference voltage. When reduced to exponential form and solved for the signal magnitude, a constant multiplying factor and constant subtractive term appear in addition to the multiplying terms corresponding to the switchable attenuators, as shown by the following equation.

(2)

$$|E_S|=|E_R|\left\{\left[\frac{(1-\mu)}{\mu}^{\frac{b_5-1}{2}}\right]\left[\frac{(1+\mu)}{\mu}^{\frac{b_4-1}{2}}\right]\left[\frac{(1+\mu)}{\mu}^{\frac{b_3-1}{2}}\right]\left[\frac{(1+\mu)}{\mu}^{\frac{b_2-1}{2}}\right]\left[\frac{(1+\mu)}{\mu}^{\frac{b_1-1}{2}}\right]\left[\frac{(1+\mu)}{\mu}^{\frac{b_0-1}{2}}\right]\left[\frac{(1+\mu)^{\frac{63}{64}}}{\mu}\right]-1\right\}$$

The attenuation provided by the attenuators 50, 51, etc. is expressed by the figures in parentheses in FIG. 1 which are the ratio of the output to input voltages for each individual attenuator. These values of attenuation correspond to the variable bracketed multiplier terms in Equation 2. Also, preceding switchable attenuator 50 is shown a fixed attenuator comprised of resistors $R_{46}$, $R_{47}$, and $R_{48}$ having an output to input ratio of 0.939. This attenuator is not subject to logical control and represents the bracketed constant multiplier term of Equation 2. The amount of attenuation provided by the network 40 is determined by the product of the attenuations of the individual attenuators which have not been removed by the action of the corresponding attenuator switches. In addition, the attenuation network 40 is shown with resistors $R_{45}$ and $R_{49}$ at each end, these resistors have the same value as the characteristic impedance of the individual attenuators and are provided to insure that a uniform characteristic impedance appears at the network terminals 41 and 43.

The voltage appearing at terminal 43 from switch 19 will be of opposite polarity to the output of attenuator network 40. This voltage corresponds to the subtractive term of the equation and only its polarity is subject to logical control. It is found that by setting resistor $R_{44}$ to $\mu$ times the characteristic impedance of the attenuators, this constant term results in a zero voltage at terminal 43 when the attenuators are all in. Thus, merely changing the polarities at terminals 41 and 42 enables the decoder to operate in a bipolar manner.

The solution of Equation 2 requires $E_R$ to be 1.075 $|E|_S$ as shown by the all attenuators removed situation in which the constant multiplier term is still present. However, the magnitude of reference voltages 27 and 28 must be twice this value to compensate for the use of the characteristic impedances by resistors $R_{44}$ and $R_{45}$. The fixed attenuator comprising resistors $R_{46}$, $R_{47}$ and $R_{48}$ may be eliminated from network 40 by decreasing the resistor $R_{44}$ to increase the subtractive voltage appearing at terminal 43. For this particular embodiment, adjusting $R_{44}$ to 93.9 times the characteristic impedance provides a zero coding means output for the all attenuators in case. Adjustment of $R_{44}$ under these conditions permits the coding means to be periodically recalibrated if desired. It is to be noted, however, that the voltage applied to first removable attenuator remains equal to the highest signal expected to be transmitted.

Figure 2:
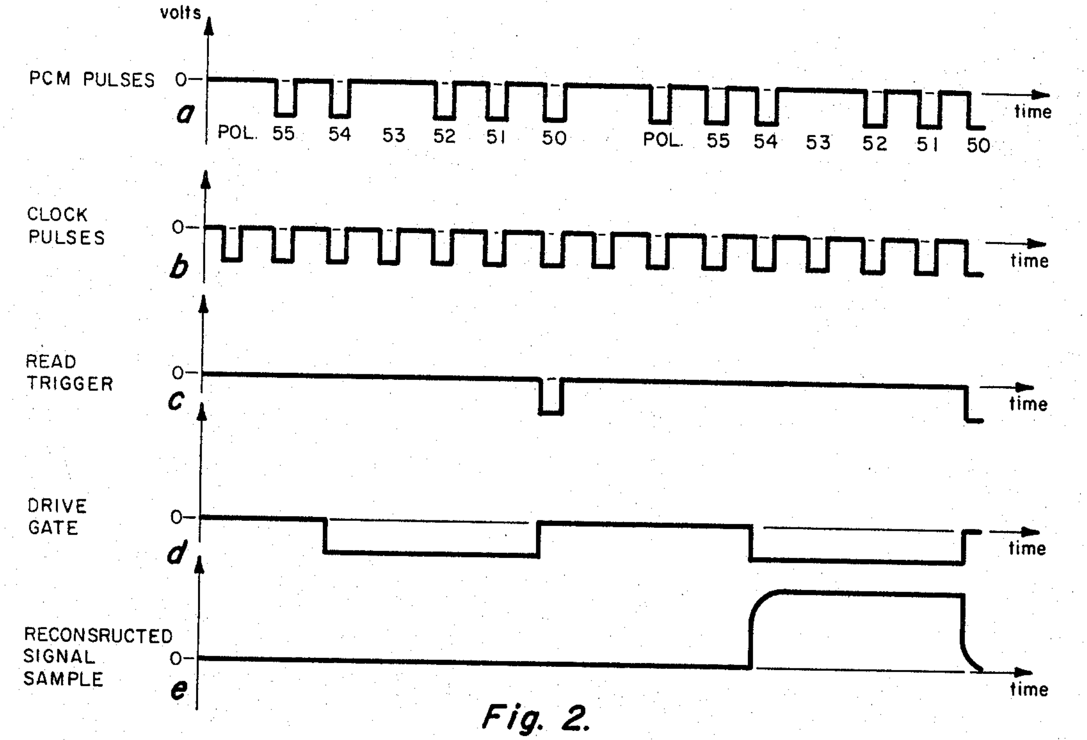
FIG. 2 is a timing diagram for the decoder of FIG. 1.

The timing diagram shown in FIG. 2, for the above described decoder, contains lines *a* and *b* illustrating the PCM and clock pulses associated with shift register 10. The first PCM pulse group lacks a polarity pulse indicating a positive signal sample with the attenuators corresponding to each magnitude bit shown therebelow. Coinciding with the receipt of the seventh bit, the read trigger is applied and the PCM group is transferred to flip-flops 16, 16' so that the following PCM pulse may be read into register 10. At the start of the third bit of the next group, the drive gate *d* is applied and maintained until the start of its seventh bit. This causes the attenuator network to switch accordingly and the reconstructed signal sample appearing at terminal 43 is shown by waveform *e*. The duration of the drive gate as shown determines that of the signal sample and may be altered if desired.

Figure 3:
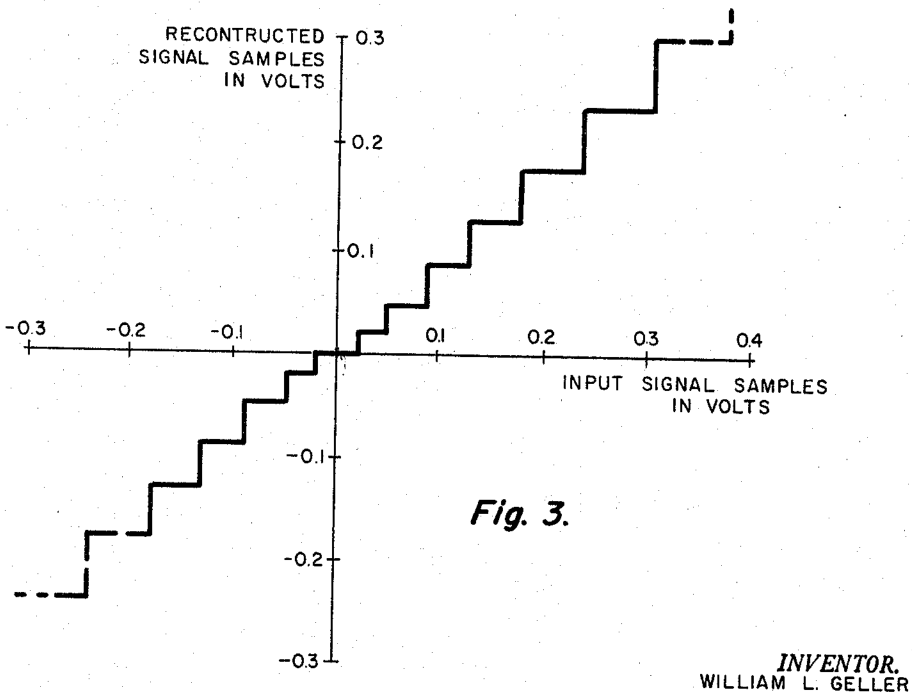
FIG. 3 is a graph showing the small signal range of the bipolar quantizing characteristic of the invention.

The graph of FIG. 3 shows the small signal portion of the relationship between the signal sample translated into the PCM code and the output of the decoder of FIG. 1. Each horizontal step of the ladder-like array corresponds to one or more attenuators being removed from the network. The zero reference level corresponds to the "all attenuators in" situation and can be achieved from either the positive or negative direction. Thus the decoder is capable of bipolar operation. Since the same network of attenuators determines the characteristic in both quadrants and is independent of the polarity of the reference voltage, the characteristic is therefore symmetrical. It is to be noted that 64 levels of varying magnitude are available for each signal in a six bit code and that the maximum quantizing error is never larger than the size of the corresponding step.

Figures 4, 4A:
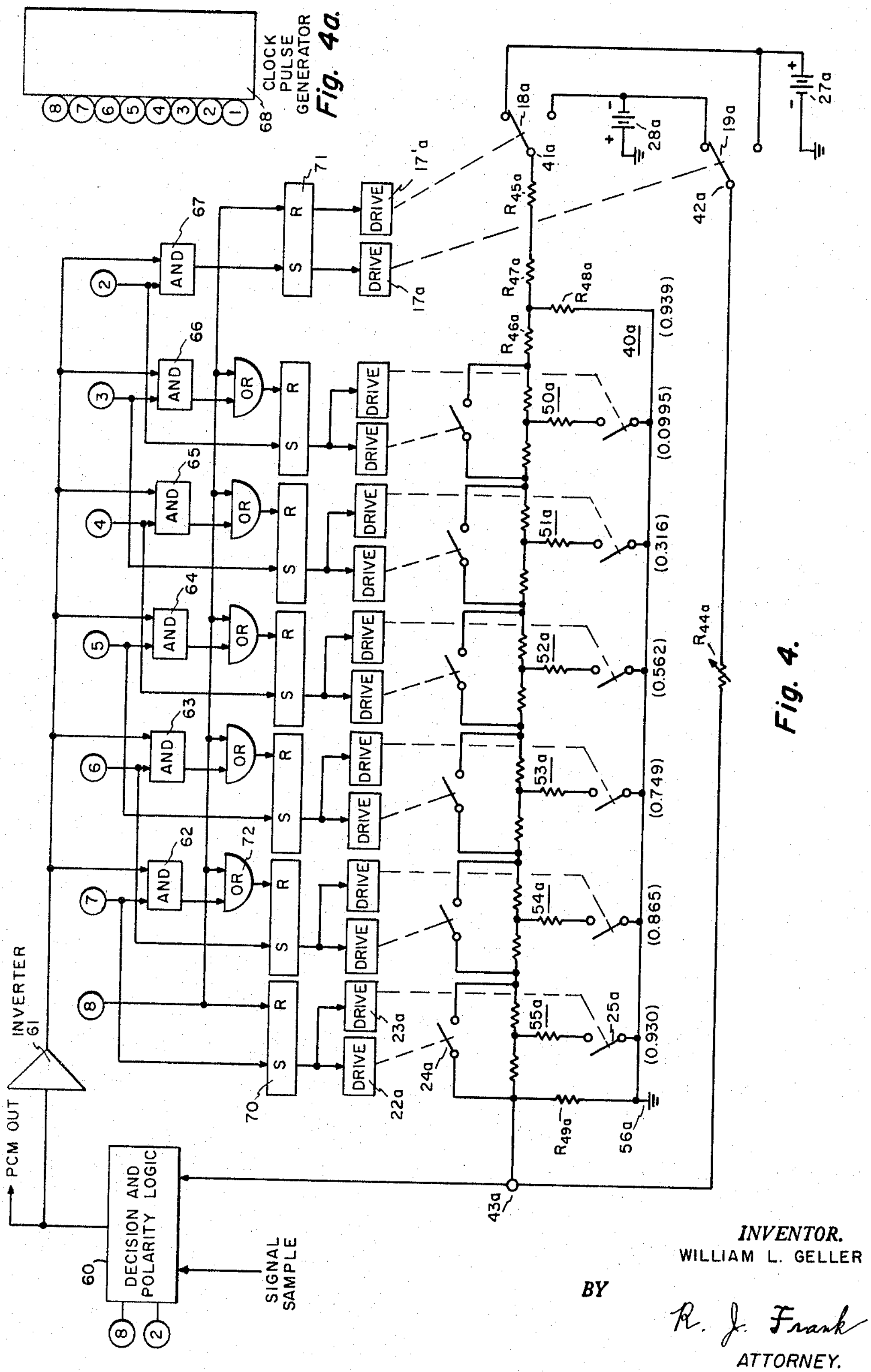
FIG. 4 is a block schematic diagram of an encoder in accordance with the invention, with FIG. 4A showing the clock pulse generator associated therewith.

As mentioned previously, the invention may also be employed as an encoder. This is shown by the encoder of FIG. 4, wherein a similar coding means is placed in a feedback path. The signal sample is applied to the decision and polarity logic circuit 60 which produces the transmitted PCM pulse code groups. The coding means input is connected to receive the PCM output pulses, while the coding means output is fed back into the logic circuit for comparison with the signal sample.

The attenuator network 40*a*, the series and shunt switches 24*a*, 25*a*, and drive means 22*a*, 23*a* correspond to that previously described for the decoder of FIG. 1. In addition, the reference voltages and the corresponding switches are the same.

The output of logic circuit 60 is fed through inverter gate 61 to a plurality of coincidence or "and" gates 62 through 67. As known in the art, an inverter will pass a pulse for zero input and have a zero output for a pulse input. Also connected to these gates is the clock pulse generator 68 of FIG. 4A, the output of which is a sequence of clock pulses in phase with the PCM code pulses. As shown, clock pulse 2 coinciding in time with the polarity bit is supplied to logic circuit 60 and "and" gate 67. Clock pulse 3 coincides with the occurrence of the most significant magnitude bit and is fed to "and" gate 66 and so on. It is to be noted that clock pulse 8 in phase with the least significant bit is supplied directly to the reset position of the flip-flop controlling attenuator 55*a* and the polarity flip-flop 71, and is connected to the reset positions of the other flip-flops 70 through the corresponding buffer "or" gates 72. This pulse, hereinafter referred to as the reset pulse, resets polarity flip-flop so that at the end of each PCM group the positive reference voltage is applied to attenuator network 40*a*. In addition, pulse generator 68 is shown having clock pulse 1 output that is not used. This pulse coincides with the interval between samples and may be used as a marking pulse if desired.

As the reset pulse occurs at the end of a pulse code group, the attenuators are in the all-in condition when the next signal sample is supplied to logic circuit 60. The one-bit interval corresponding to clock pulse 1 is shown in the timing chart of FIG. 6. During this interval the coding means output at terminal 43 is fixed at zero and the polarity of the signal sample is determined. For the positive signal of FIG. 6, no PCM pulse is generated by logic circuit 60 so that inverter circuit 61 provides a pulse at "and" gate 67 that is coincident with clock pulse 2. Thus the polarity flip-flop 71 is placed in its set condition and a positive voltage appears at terminal 42*a*, with a negative voltage at terminal 41*a*.

Once the polarity decision is made by logic circuit 60, the absolute magnitudes of the sample and coding means output are compared while sequentially removing attenuator sections of decreasing significance. The particular logic circuit employed relies on sensing the polarity of the difference between the coding means output and signal sample, therefore requiring the coding means output to be of opposite polarity. It is recognized that other logic circuits may be employed in which the polarity switching will be reversed.

Figure 6:
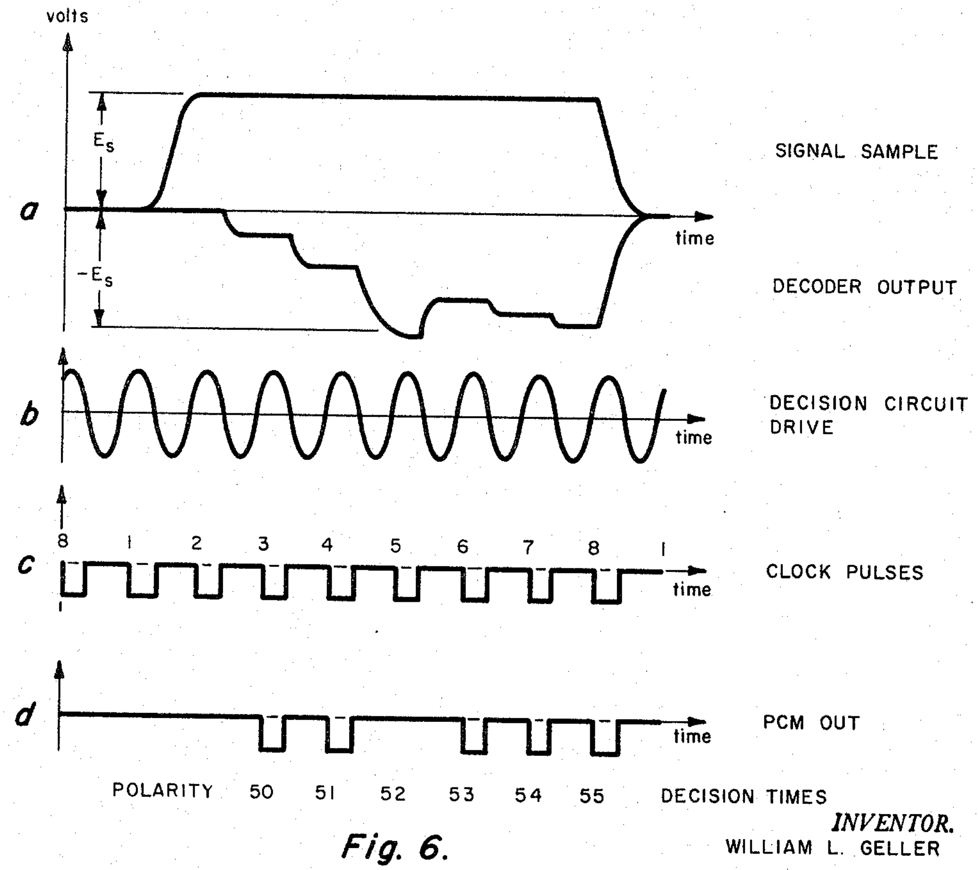
FIG. 6 is a timing diagram for the encoder of FIG. 4.

As shown in FIG. 6, clock pulse 2 removes attenuator 50*a* and causes a negative voltage to appear at terminal 43*a*. The magnitude of the voltage at terminal 43*a* causes logic circuit 60 to generate a pulse and consequently inverter circuit 61 has a no pulse output so that there is a lack of coincidence at "and" gate 66 and attenuator 50*a* remains bypassed. During this time clock pulse 3 sets the flip-flop of attenuator 51*a* and it is removed. The sequence is then repeated until the removal of attenuator 52*a* causes the coding output to exceed the signal sample. For this condition no pulse is generated so that the inverter circuit output coincides with clock pulse 5 to cause attenuator 52*a* to the reinserted. However, clock pulse 5 still causes attenuator 53*a* to be removed in the normal manner.

The sequence continues so that the coding means output has a magnitude that is the largest possible without exceeding the signal sample. It will be recognized that the coding output will differ somewhat from the sample magnitude. This error is the deliberate quantization error and in the above described encoder, the maximum error cannot exceed the size of the corresponding step in the characteristic of FIG. 3. The selective removal of the attenuators from network 40*a* continues until all have been removed, even though the desired coding means output voltage has been produced prior thereto. The last clock pulse 8 then serves to return all the attenuators to the all-in condition corresponding to zero output voltage and polarity switch 18*a* to the positive reference voltage. Thus the coding means is in proper condition for the succeeding signal sample.

Figure 5:
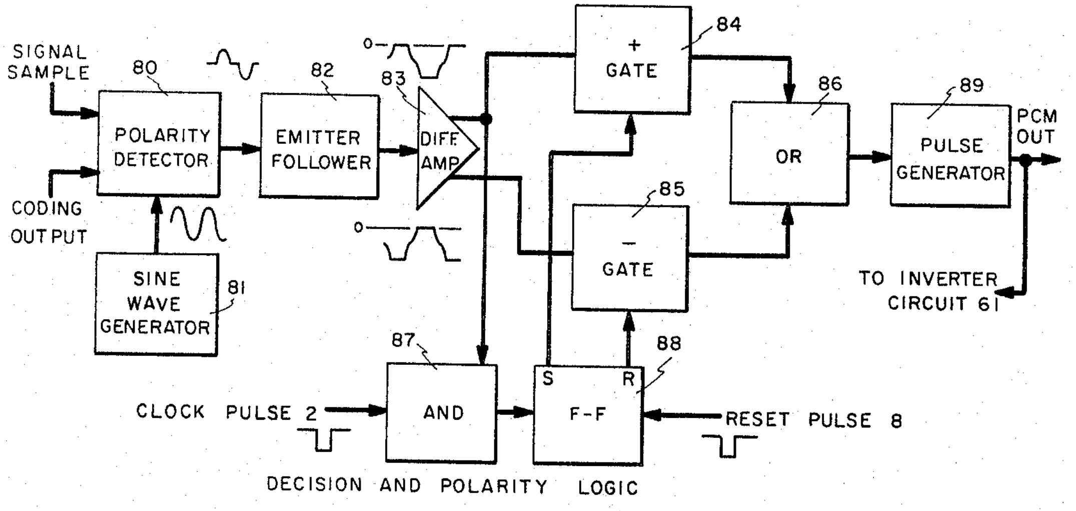
FIG. 5 is a block schematic diagram of the logic circuits of the encoder of FIG. 4.

Logic circuit 60 is shown more particularly in FIG. 5 wherein the signal sample and the coding means output are applied to polarity detector 80. Polarity detector 80 adds the two inputs and provides an output signal of the same polarity as the resulting sum. The output will be either a positive or negative departure from zero as shown in FIG. 5. This detector may therefore utilize the "Goto" circuit employing a balanced pair of tunnel diodes driven by sine wave generator 81 and as described in the General Electric Tunnel Diode Manual of 1961 at page 60.

The output of polarity detector 80 is passed through emitter follower 82 which acts as a buffer and driver for differential amplifier 83. The differential amplifier has two outputs, one of which is zero depending on the polarity of the input signal. The other output of said amplifier passes the amplified pulse as shown in FIG. 5. Each of said outputs is connected to a corresponding gate circuit 84, 85 and then to "or" circuit 86 which triggers pulse generator 89.

The conditioning of plus gate 84 and minus gate 85 is controlled by the states of flip-flop 88. As shown, if flip-flop 88 is in its set condition, plus gate 84 is conditioned to pass pulses while minus gate 85 is not. The resetting of flip-flop 88 by reset pulse 8 from clock pulse generator 68 conditions minus gate 85 to pass a pulse and plus gate 84 not to pass a pulse. Thus, at the start of the encoding process, minus gate 85 is open and plus gate 84 is closed.

As mentioned previously, the coding means output is zero at the time of the polarity decision with the positive reference voltage **27*a* applied to network 40*a*. If the signal sample is negative, polarity detector 80 will produce a negative pulse that is passed by open minus gate 85 and results in a PCM pulse being generated. However, the inverter circuit 61 will have a no pulse output and polarity switches 18*a*, 19*a* will not be changed. The logic circuit is now responsive to negative difference signals and a PCM pulse will be generated when the sum of the negative sample and positive coding output is negative. If the coding means output exceeds the magnitude of the sample, the positive output of amplifier 83 is not passed by gate 84**.

If a positive signal sample is applied, no PCM polarity pulse will be generated as gate 84 is closed and the polarity switches are driven such that the negative reference voltage **28*a* is applied to network 40*a*. Referring to FIG. 6, the polarity decision is made at the time clock pulse 2 is generated and applied to "and" gate 87. Thus for a positive sample, coincidence occurs at "and" gate 87 and switches flip-flop 88 to its set position conditioning gate 84 to pass pulses and closing gate 85. This has now set the logic circuit to trigger generator 89 when a positive difference is sensed by the polarity detector. Since this condition corresponds to the positive sample, the coding means performs the same sequence of operations for signal samples of either polarity once the polarity decision has been made by detector 80**.

Figure 7:
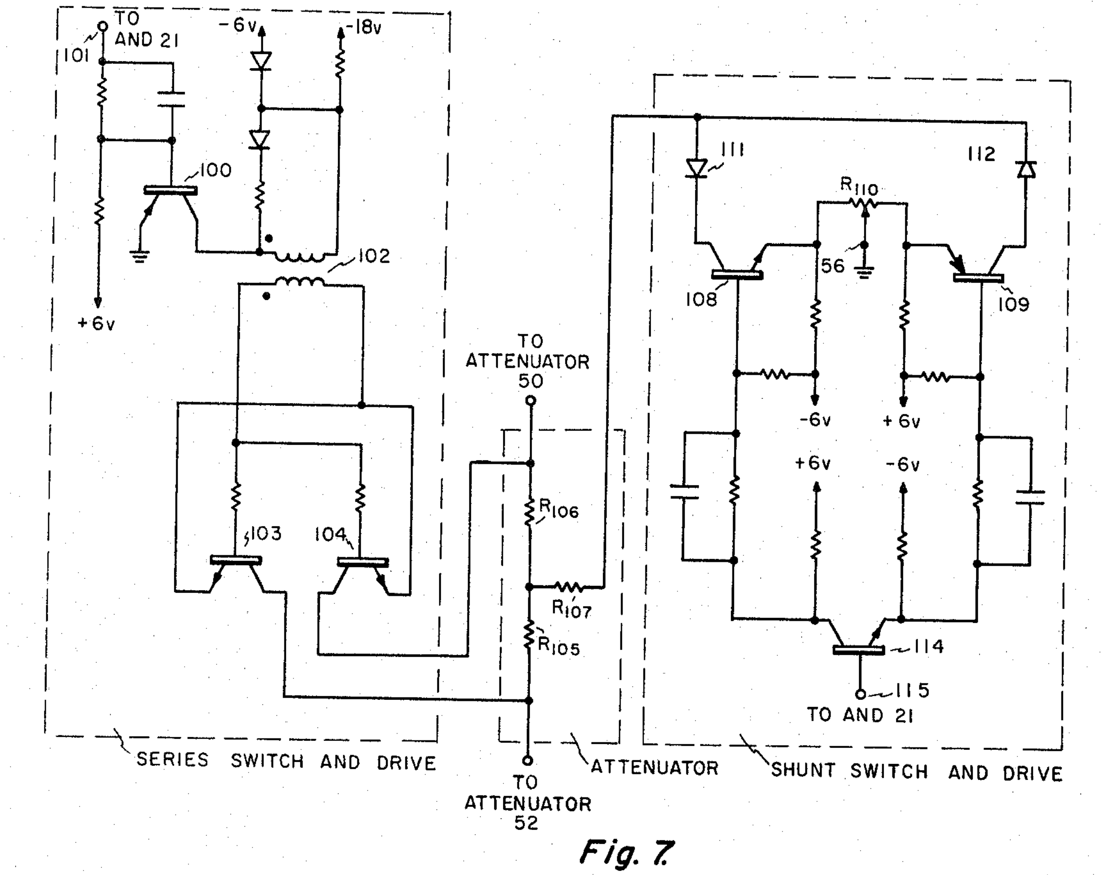
FIG. 7 is a schematic diagram of an individual attenuator and associated switches.

FIG. 7 is a schematic of attenuator 51 of FIG. 1 and series and shunt switches 24 and 25 with their corresponding drives 22 and 23. However, it is to be noted that the following description applies also to the other attenuators shown in FIGS. 1 and 4.

Since the attenuators are normally in the network, series switch 24 is normally open while shunt switch 25 is normally closed. To drive switch 24 to its closed position, a neagtive pulse at terminal 101 from the corresponding "and" gate 21 drives transistor 100 on and thereby causing a voltage to appear across the secondary of transformer 102. As shown, the positive terminal of the transformer secondary is connected to the bases of transistors 103 and 104 while the coupled emitters thereof are returned to the negative side. Transistors 103 and 104 have their collectors tied to the opposite sides of the series resistors $R_{105}$ and $R_{106}$ of the attenuator and are normally off due to the lack of drive. However driving transistor 100 on, drives the base of transistors 103 and 104 positive with respect to their emitters and turns them on to essentially short circuit resistors $R_{105}$ and $R_{106}$. Since transistors 103 and 104 are connected in opposition the off-set voltages of the transistors cancel and there is substantially zero voltage drop across the pair.

In the absence of a pulse at terminal 115, the path through resistor $R_{107}$ must be connected to ground through terminal 56 for either polarity reference voltage. Thus transistors 108 and 109 are normally on with current flowing across resistor $R_{110}$ and through diodes 111 and 112. It is seen from the polarity of diodes 111 and 112 that resistor $R_{107}$ will be connected to ground and that at least one of the transistors will be on for either polarity reference voltage. As shown, resistor $R_{110}$ has a variable tap to ground terminal 56 so that the circuit may be balanced if for example the diodes have unequal voltage drops. To remove resistor $R_{107}$ from terminal 56, transistors 108 and 109 are driven off by the application at terminal 115 of the negative pulse from the corresponding "and" gate 21. This pulse, coinciding in time with that appearing at terminal 101, drives transistor 114 on and acts to remove the base voltage from transistors 108 and 109 so that they are turned off. Although shown in conjunction with a T attenuator, the switches may be readily adapted for use with other configurations.

Figure 8:
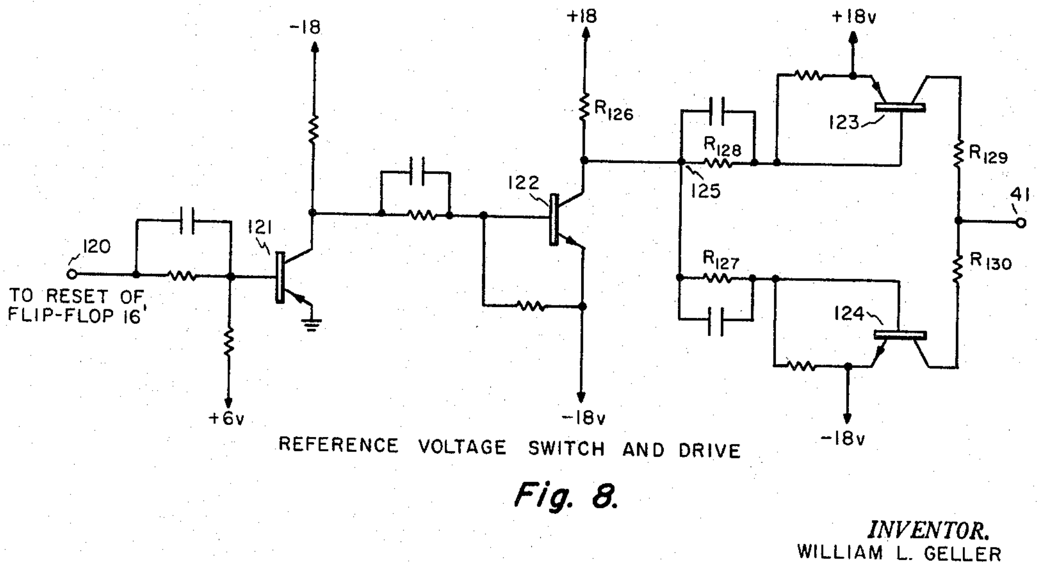
FIG. 8 is a schematic diagram of a reference voltage switch.

Referring now to FIG. 8, the reference voltage switch 18 and associated drive means 17' of FIG. 1 are shown. It is to be noted that the other polarity switch 19 and those of FIG. 4 are the same. The switch, as stated, provides a negative reference voltage output to network 40 in the absence of drive. As shown, zero input to terminal 120 finds transistors 121 and 122 turned off.

In this condition, transistor 124 is driven on and the negative reference voltage appears at terminal 41. By selecting resistors $R_{127}$ and $R_{128}$ to be substantially larger than resistor $R_{126}$, point 125 is held at essentially +18 volts and there is no drive for transistor 123. However, a negative pulse at terminal 120 turns on transistor 121 which raises the base voltage of transistor 122 and turns it on causing point 125 to go to essentially −18 volts. This turns off transistor 124 and drives transistor 123 on to cause the positive reference voltage to appear at terminal 41.

In this embodiment, the resistor $R_{129}$ and $R_{130}$ were selected to be quite low, for example 10 ohms, so that the reference voltage magnitude was 18 volts. However, other voltages and resistors may be employed depending on the maximum signal sample the system is designed to transmit.

While the above descriptions have been in reference to specific embodiments of the invention, it is recognized that modifications may be made therein and that other embodiments may be built without departing from the spirit and scope of the invention.

What is claimed is:

1. In a pulse code modulation system wherein a signal quantized with its magnitude and polarity expressed by a digital pulse code group according to a logarithmic permutation code, coding means for reconstructing said signal which comprises:

(a) an input terminal;

(b) an output terminal;

(c) a plurality of cascaded attenuators coupled between said input and output terminals, each attenuator having its individual attenuation determined in accordance with the logarithmic permutation code;

(d) attenuator switch means connected to individual attenuators in said cascade, said means providing a loss-less bypass of selected attenuators in response to the magnitude bits of said code group, the amount of attenuation between said input and output terminals being determined by the product of the individual attenuations of unremoved attenuators, (e) bipolar means for applying a reference voltage to the input terminal of said cascaded attenuators, the polarity of said applied reference voltage being determined by the polarity bit of said code group, (f) means for applying a voltage of constant magnitude and opposite polarity to that of said reference voltage to the output terminal of said cascade, the magnitude of said voltage being a function of the logarithmic permutation code, and (g) means coupled to said bipolar means and said attenuator switch means for applying the bits of the pulse code group thereto, the resultant signal appearing at the output terminal of said cascade being a reconstruction of the quantized signal magnitude.

2. Coding means in accordance with claim 1 further comprising polarity switch means coupled to said bipolar means and adapted to switch the polarity of said reference voltage in response to the polarity bit of said code group.

3. Coding means in accordance with claim 2 wherein said attenuator switch means comprises a plurality of attenuator switches connected to all but one of said cascaded attenuators, said switches providing a loss-less bypass of selected attenuators in response to the magnitude bits of said code group.

4. In a pulse code modulation system wherein a signal is quantized with its magnitude and polarity expressed by a digital pulse code group according to a logarithmic permutation code for transmission, a decoder for reconstructing said signal from the received pulse group which comprises:

(a) register means for receiving the bits of said pulse code group;
(b) storage means connected to said register means;
(c) a plurality of gates connected between said register and said storage means and adapted to be energized to pass an entire pulse code group to said storage means;
(d) a plurality of cascaded matched attenuators having an input terminal and an output terminal, each attenuator having its individual attenuation determined in accordance with the logarithmic permutation code;
(e) bipolar reference voltage means connected to the input terminal of said cascaded attenuators for applying a reference voltage thereto equal to the largest signal to be reconstructed;
(f) a polarity switch connected to said storage means and responsive to the polarity bit of said stored code group, said switch coupled to said reference voltage means to determine the polarity thereof;
(g) means for applying a voltage of constant magnitude and opposite polarity to that of said reference voltage to the output terminal of said cascaded attenuators, the magnitude of said voltage being a function of the logarithmic permutation code employed;
(h) a plurality of attenuator switches connected to the individual cascaded attenuators, said switches adapted to selectively remove attenuators from the cascade in response to the magnitude bits of the stored code group, the amount of attenuation between said input and output terminals being determined by the product of the individual attenuations of unremoved attenuators; and
(i) a plurality of drive gates connected between said storage means and said attenuator switches, the energization thereof determining the period during which the selected attenuators are removed from the cascade, the resultant output voltage of the decoder appearing at the output terminal of said cascaded attenuators being the reconstructed quantized signal.

5. In a pulse code modulation system wherein a signal is quantized with its magnitude and polarity expressed by a digital pulse code group according to a logarithmic permutation code, an encoder for translating said signal into code which comprises:

(a) a plurality of cascaded matched attenuators having an input terminal and an output terminal, each attenuator having its individual attenuation determined in accordance with said logarithmic permutation code;
(b) bipolar reference voltage means connected to the input terminal of said cascaded attenuators for applying a reference voltage thereto;
(c) polarity switch means coupled to said reference voltage means and adapted to switch the polarity thereof in response to the polarity bit of said code group;
(d) means for applying a voltage of constant magnitude and opposite polarity to that of said reference voltage to the output terminal of said cascaded attenuators, the magnitude of said voltage being a function of said logarithmic permutation code;
(e) a plurality of attenuator switches connected to said cascaded attenuators, said switches being adapted to selectively remove attenuators from the cascade in response to the magnitude bits of said code group, the amount of attenuation between said input and output terminals being determined by the product of the individual attenuations of unremoved attenuators;
(f) comparator means adapted to receive the signal to be encoded and connected to the output terminal of said cascaded attenuators, said comparator means comprising the signal and the resultant voltage at the output terminal and providing an output dependent on the polarity of the difference thereof, the output of said comparator means being the encoded signal;
(g) means for driving the attenuator switches to sequentially remove individual attenuators from the cascade;
(h) gate means connected between the output of said comparator and the attenuator switches and adapted to reinsert the last removed attenuator when the comparator output indicates a change in the polarity of the difference; and
(i) means for reinserting all attenuators at the end of a pulse code group so that the resultant voltage at the output terminal of the cascaded attenuators is zero at the time of the first comparison.

References Cited

UNITED STATES PATENTS

| | | | |
|---|---|---|---|
| 2,827,233 | 3/1958 | Johnson et al. | 340—347 |
| 2,889,409 | 6/1959 | Carbrey | 179—15 |

ROBERT L. GRIFFIN, *Primary Examiner.*
JOHN W. CALDWELL, *Examiner.*
W. S. FROMMER, *Assistant Examiner.*